Figure 1:
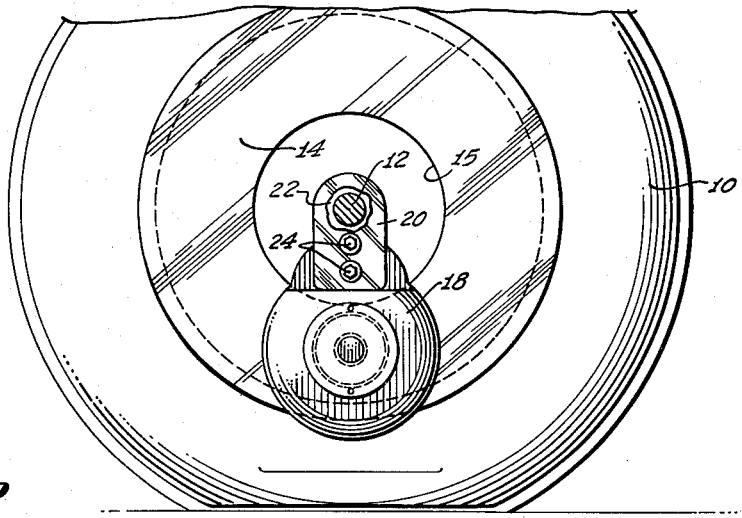

Aug. 22, 1961 T. T. CAGLE 2,997,138
WEAR COMPENSATING BRAKE
Filed April 28, 1959

INVENTOR.
Toby T. Cagle
By Smyth & Roston
Attorneys

2,997,138
WEAR COMPENSATING BRAKE
Toby T. Cagle, 13403 Stanbridge Ave., Bellflower, Calif., assignor of one-eighth to Raymond E. Astle, one-eighth to Frank Lamb, one-eighth to Robert B. Sprague, one-sixteenth to Thomas F. McCarry, and one-sixteenth to Joseph E. Madden
Filed Apr. 28, 1959, Ser. No. 809,412
3 Claims. (Cl. 188—73)

This invention relates to a brake assembly of the type set forth in the Cagle Patent 2,497,438, which issued February 14, 1950.

A brake assembly of this type includes a brake housing in the form of a casting that straddles a brake disk, the brake disk being carried by a vehicle wheel and rotating with the vehicle wheel but having a degree of freedom for axial adjustment relative to the wheel. The housing casting loosely confines a pair of circular brake blocks adjacent the opposite faces of the brake disk and further provides a brake cylinder with a piston therein to thrust toward one of the two brake blocks thereby to cause the two brake blocks to exert high magnitude pressure against the two opposite faces of the brake disk.

A suitable spring means normally holds the piston retracted and thereby normally provides clearance between both of the brake blocks and the intervening brake disk. A member to back the spring means and receive its reaction force is frictionally mounted in the outer end of the brake cylinder. This backing member withstands the maximum reaction force of the spring but slidingly yields to the advances of the piston that are caused by reduction in the thickness dimension of the two brake blocks and the intervening brake disk. Such reduction in dimension arises from wear and at times is caused by dropping temperature.

One problem to which the present invention is directed is the problem of controlling the frictional resistance to axial movement of the backing means. This frictional resistance should be adjustable so that it may be regulated to exceed the maximum reaction force of the spring means and the means for adjustment should be reliable to maintain any degree of frictional resistance that may be selected.

This problem is solved by employing a stationary split collar member to grip the backing member and by employing adjustable spring means to provide the required gripping force. In the presently preferred embodiment of the invention, the split gripping collar has two spaced circumferential ends and an adjustment screw extends through an aperture in one of these ends and is threaded into the other end. A coil spring embraces the adjustment screw and seats against the head of the screw so that rotation of the screw variably compresses the spring to vary the frictional resistance to axial movement of the backing member.

A second problem to which the invention is directed is the problem of simplifying a brake assembly and at the same time making the brake assembly rugged to stand up to a long service life without attention. In the preferred practice of the invention, this problem is met by using a Belleville spring to hold the brake piston in its normal retracted position. This Belleville spring is confined between two transverse walls, one of which is connected to the backing member and the other of which is movable with the piston. When the piston is advanced by fluid pressure for braking operation, it narrows the spacing between these two transverse walls and thus stresses the Belleville spring. Spacer means limits the spacing between the two transverse walls to a predetermined minimum and thus limits the stressing of the Belleville spring to a predetermined maximum.

In the preferred practice of the invention, the backing member is simply a solid cylinder with a radial flange at its inner end and the two transverse walls are annular members that loosely surround the backing member. One of these annular members backs against the radial flange at the inner end of the backing member and is thereby operatively connected with the backing member. The other of the two annular members backs against an inner circumferential retaining ring carried by the brake piston and is thereby made movable with the brake piston. The required spacer between the two transverse walls may be a spacer ring but in the preferred embodiment of the invention is simply an inner circumferential flange of one of the two annular members.

The features and advantages of the invention may be understood by reference to the following detailed description together with the accompanying drawing.

Figure 2:
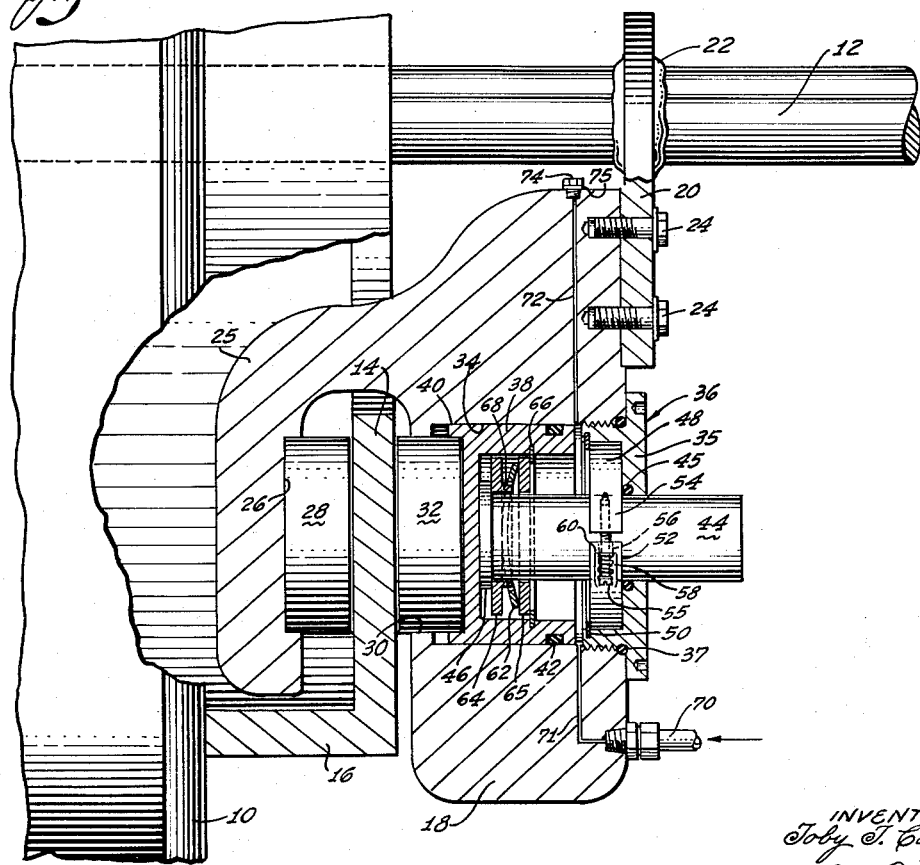

In the drawing, which is to be regarded as merely illustrative:

FIG. 1 is a side elevation of the preferred embodiment of the brake assembly mounted for cooperation with a brake disk of a vehicle wheel; and FIG. 2 is a view largely in cross section and partly in side elevation showing the internal structure of the brake assembly.

The drawing illustrates the invention as applied to the braking of a landing wheel of an aircraft but, of course, the invention may be used to brake any rotating member.

The aircraft or vehicle wheel 10 is journaled on an axle 12 and carries what is commonly termed a brake disk 14 which is of annular configuration with an inner circumferential edge 15. The brake disk 14 is integral with a cylindrical wall 16 by means of which it is supported on the wheel 10 for rotation therewith. In a well-known manner that need not be described, the brake disk 14 is interlocked with the wheel 10 but has a certain degree of freedom for axial shift relative to the wheel.

The brake assembly of the present invention includes a housing 18 which may be in the form of a single casting. This housing body 18 is carried by a hanger plate 20 which is mounted on the axle 12 and is united therewith by welding 22. The housing body 18 is secured to the hanger plate 20 by suitable cap screws 24.

The housing body 18 straddles the inner edge 14 of the brake disk 14 and for this purpose is formed with an arm 25 that extends inside the brake disk 14. This arm is formed with a circular recess 26 to loosely seat a circular brake block 28, this brake block being adjacent the inner face of the brake disk. The housing body 18 has a cylindrical opening 30 on the outer side of the brake disk 14 which loosely seats a second circular brake block 32 adjacent the outer face of the brake disk.

The housing body 18 forms a brake cylinder 34 which is coaxial with and communicates with the second brake block 32. The outer end of this brake cylinder 34 is closed by an end wall 35. In the construction shown, the end wall 35 is a portion of a flanged hollow plug 36 that screws into the housing casting, the joint being sealed by a suitable O-ring 37.

Slidingly mounted inside the brake cylinder 34 is a cup-shaped piston 38 that is positioned to abut the second circular brake block 32 and is formed with a circumferential end flange 40 that slidingly embraces the brake block. The piston has an outer circumferential groove to seat an O-ring 42 which seals off the interior of the brake cylinder from the circular brake block 32.

What may be termed a backing member 44 slidingly extends through the end wall 35 of the brake cylinder and is embraced by an O-ring 45 in the end wall to prevent leakage from the brake cylinder. The inner end of the backing member 44 is formed with a radial flange 46.

Frictional resistance to sliding action of the backing member 44 relative to the end wall 35 is provided by a split collar 48 that embraces the backing member. The split collar 48 nests into the hollow plug 36 and is fixedly secured therein by an inner circumferential snap ring 50. The split collar 48 has a pair of spaced circumferential ends 52 and 54. A headed screw 55 extends through an aperture 56 in the circumferential end 52 and is threaded into the other circumferential end 54. A coil spring 58 surrounds the screw 55 in compression between the head of the screw and a shoulder 60 of the circumferential end 52. It is apparent that the confinement of the coil spring 58 under compression causes the split collar 48 to grip the backing member 44 and that the gripping force may be varied by tightening or loosening the headed screw 55.

The piston 38 is normally retracted to permit adequate clearance between the two brake blocks 28 and 32 and the brake disk 14 when the brake cylinder 34 is not under operating pressure. The retraction of the piston 38 after each braking operation is accomplished by a Belleville spring 62 that acts between the piston and the backing member 44.

In the preferred practice of the invention, the Belleville spring is confined in a variable manner between two transverse wall members 64 and 65. In the construction shown, the transverse wall member 64 is an annular member that loosely encircles the backing member 44 in abutment with the radial flange 46 and is thereby, in effect, connected with the backing member. The second transverse wall member 65 is in the form of a flat ring that also loosely surrounds the backing member 44. This flat ring 65 abuts a snap ring 66 that is seated in the inner circumferential wall of the piston 38 and therefore moves with the piston whenever the piston shifts inward.

Suitable spacer means is provided to limit the relative movement between the two transverse wall members 64 and 65 thereby to determine the maximum stress to which the Belleville spring 62 may be subjected. In the construction shown, the spacer means required for this purpose comprises an inner circumferential flange 68 of the transverse wall member 64.

The brake cylinder 34 is connected to a fluid line 70 by means of which the brake cylinder is placed under high fluid pressure whenever a braking operation is desired. In the construction shown, communication between the brake cylinder 34 and the fluid line 70 is provided by an angular bore 71 in the housing body 18. The fluid line 70 is usually connected to a liquid source for hydraulic actuation of the brake but may be connected to a source of gaseous fluid such as compressed air if desired. Since the present embodiment of the invention is intended to be hydraulically actuated, a bleeder bore 72 extends upward from the brake cylinder 34 through the housing body 18 to permit air to be displaced out of the brake cylinder in the course of the filling of the brake cylinder with hydraulic fluid. This bleeder bore is normally closed by a screw plug 74 fitted with a gasket 75.

It is essential for proper operation that the resistance to axial movement of the backing member 44 that is provided by the pressure grip of the split collar 54 exceed the maximum stressing of the Belleville spring 62. In other words, the maximum force exerted by the Belleville spring 62 when the two transverse wall members are at their minimum spacing permitted by the flange 68 must be insufficient to cause the backing member 44 to slip axially in the split collar 54. On the other hand, the resistance to axial movement of the backing member 44 provided by the split collar 48 should not be of such magnitude as to withstand the operating pressure of the hydraulic fluid when the brake is applied.

For example, the Belleville spring 62 may exert an axial force on the order of 30 to 70 pounds when fully compressed and the frictional grip of the split collar 54 on the backing member 44 may be adjusted to resist an axial force of 150 to 200 pounds. The effective cross sectional dimension of the backing member 44, i.e., the diameter of the portion that extends through the O-ring 45 may be one inch and the outside diameter of the piston 38 may be two and one-half inches. At an operating fluid pressure of 400 p.s.i. in the brake cylinder 34 for a moderate braking action, the outward thrust of the brake fluid against the backing member 44 is approximately 300 pounds which is sufficient to overcome the frictional resistance of the split collar 48. For a severe braking action, the operating fluid pressure may reach, for example, 800 p.s.i.

It is apparent from this example that the adjustment of the frictional grip of the split collar 48 is not critical since the mechanism will operate satisfactorily with the frictional resistance of the split collar at any value above 70 pounds and below 300 pounds. Because of this wide latitude, adjustment of the screw 55 to adjust the grip of the collar 48 is required only in the original assembly of the brake. If, however, it is necessary to adjust the screw 55 after the brake is placed in service, the cylinder is drained of fluid and the hollow block is unscrewed. Since the split collar 48 is secured inside the hollow block by the snap ring 50, the unscrewing of the block shifts the piston and the cylinder outward. When the block is completely unscrewed, the piston and cylinder assembly may be removed and the split collar, together with the surrounding hollow block 36, may be forcibly shifted outward on the backing member 44 until the snap ring 50 is accessible for removal to make the screw 55 accessible. After the screw 55 is adjusted, the snap ring may be replaced and then the split collar and the hollow block may be forcibly shifted along the backing member 44 to their original positions.

FIG. 2 shows the working parts in their normal positions when the brake is idle. The Belleville spring 62 in its fully expanded state is backed against the transverse wall member 64 and contacts the second transverse wall member 65 to hold the piston 38 retracted in a yielding manner. With the piston retracted in this manner there is liberal clearance for the two brake blocks 28 and 32 to remain out of contact with the brake disk 14.

When the fluid in the chamber 34 is raised to an operating pressure for braking action, the piston 38 is forced by fluid pressure to the left as viewed in FIG. 2. During the initial portion of this leftward movement of the piston, the Belleville spring 62 is contracted and placed under maximum stress as the transverse wall member 65 abuts the spacer flange 68 of the transverse wall member 64. Thereafter the piston applies braking pressure directly to the brake block 32 and since the brake disk 14 is free for axial adjustment, the second brake block 28 is placed under substantially the same pressure so that the brake disk 14 is clamped under high pressure between the two brake blocks.

The operating fluid pressure in the cylinder 34 tends to drive the backing member 44 axially outward through the split collar 48 but this tendency is defeated because as the fluid pressure rises, the piston correspondingly shifts inward to stress the Belleville spring 62 in opposition to the fluid pressure against the inner end of the backing member 44. When the transverse wall member 65 reaches the spacer flange 68, the inward thrust of the piston directly opposes the outward thrust of the backing member. It is apparent that the net braking thrust by the piston 38 depends upon the differential between the diameter of the piston and the diameter of the backing member 44. When the operating fluid pressure in the brake cylinder 34 is terminated, the Belleville spring 62 expands axially to its original configuration to retract the piston 38 to its normal idle position.

The manner in which compensation is provided for wear on the two brake blocks 28 and 32 as well as for wear on the intervening brake disk 14 may be understood when it is considered that in each braking operation the inward force of the piston 38 against the brake block 32 is more than enough to cause the backing member 44 to slide in the split collar 48. Thus in each braking operation, the backing member 44 advances to the maximum permitted by the total thickness of the brake disk 14 and the two brake blocks 28 and 32. Since this total dimension is slightly reduced by wear on each braking operation, the backing member 44 makes a corresponding wear-compensating advance on each braking operation. The distance by which the piston 38 is retracted after each braking operation is determined by the expansion of the Belleville spring 62, and since this expansion always begins at the position the piston takes under braking pressure, the piston is always retracted by the same distance relative to the brake block 32 regardless of the degree to which the two brake blocks may be worn.

In the event that the total thickness dimension of the braking disk 14 and the two brake blocks 28 and 32 temporarily increases by thermal expansion, the backing member 44 correspondingly shifts axially outward to cause the piston 38 to retract to its normal distance. This adjustment in response to thermal expansion may be understood when it is considered that the operating pressure of the brake fluid against the inner end of the backing member 44 is always sufficient to cause the backing member to shift axially outward in the absence of a counter force by the piston 38. Thus if the over-all thickness of the brake disk 14 and the brake blocks 28 and 32 increases by thermal expansion, the piston has less freedom for leftward movement in FIG. 2 and correspondingly permits rightward axial shift of the backing member 44 in compensation for the thermal expansion and in compensation for deflection of the casting.

My description in specific detail of the selected embodiment of the invention will suggest various changes, substitutions and other departures from my disclosure with the spirit and scope of the appended claims.

I claim:

1. A brake assembly for cooperation with a brake disk that is carried by a vehicle wheel comprising: a housing shaped to straddle the brake disk and forming a brake cylinder for actuating fluid; a first brake block carried by said housing in position for contact with the inner face of the brake disk; a second brake block carried by the housing position for contact with the outer face of the brake disk; a removable outer end wall closing the outer end of said cylinder in a fluid-tight manner; a piston in said cylinder responsive to the pressure of the fluid therein to apply braking pressure to said second brake block; a Belleville spring to yieldingly hold said piston in a normal retracted position relative to said second brake block when said cylinder is not under braking pressure; a member to back said Belleville spring to receive the reaction of the force applied to the piston by the Belleville spring, said backing member slidingly extending through said outer end wall of the cylinder in a fluid-tight manner whereby fluid under operating pressure in said cylinder exerts axially outward force on the backing member; a first axially outwardly facing transverse wall connected with said backing member to seat one side of said Belleville spring; a second axially inwardly facing transverse wall movable with said piston against the other side of the Belleville spring; spacer means between said two transverse walls to limit the spacing therebetween to a given minimum and thereby limit the stressing of said Belleville spring to a predetermined magnitude; a split collar connected with said outer end wall of the cylinder to grip said backing member for frictional resistance to axial movement thereof, said split collar having spaced circumferential ends; a headed screw extending through an aperture in one of said collar ends and adjustably threaded into the other collar end; a coil spring embracing said screw under compression between one said collar end and the head of the screw to maintain said frictional resistance at a magnitude greater than said maximum magnitude of the stress of said Belleville spring but less than said axially outward force whereby said backing member is non-responsive to the stress of said Belleville spring but yields to follow the advances of the piston caused by contraction in thickness of said brake blocks and said brake disk by wear and thermal contraction.

2. In a brake assembly for cooperation with a brake disk that is carried by a vehicle wheel, which assembly comprises a housing body shaped to straddle the brake disk and forming a brake cylinder for actuating fluid, a first brake block carried by said housing body in position for contact with the inner face of the brake disk; a second brake block carried by the housing body in position for contact with the outer face of the brake disk, a removable outer end wall closing the outer end of said cylinder in a fluid-tight manner, a piston in said cylinder responsive to the pressure of the fluid therein to apply braking pressure to said second brake block, spring means to yieldingly hold said piston in a normal retracted position relative to said second brake block when said cylinder is not under braking pressure, and a member to back said spring means to receive the reaction of the force applied to the piston by the spring means, said backing member slidingly extending through said outer end wall of the cylinder in a fluid-tight manner, the combination therewith of: a split collar connected with said outer wall to grip said backing member for frictional resistance to axial movement thereof, said split collar having spaced circumferential ends; and a second spring means urging said split ends of the collar towards each other.

3. A combination as set forth in claim 2 which includes a headed screw extending through an aperture in one of said collar ends and adjustably threaded into the other collar ends, said second spring means embracing said screw under compression between said one collar end and the head of the screw.

References Cited in the file of this patent

UNITED STATES PATENTS

| 2,531,341 | Meador | Nov. 21, 1950 |
| 2,551,252 | Du Bois | May 1, 1951 |
| 2,900,052 | Frayer | Aug. 18, 1959 |

FOREIGN PATENTS

| 578,038 | Great Britain | June 12, 1946 |